(12) United States Patent
Hart et al.

(10) Patent No.: US 8,052,567 B2
(45) Date of Patent: *Nov. 8, 2011

(54) MULTI-SPEED TRANSMISSIONS

(75) Inventors: James M. Hart, Belleville, MI (US);
Andrew W. Phillips, Rochester, MI (US); Scott H. Wittkopp, Ypsilanti, MI (US); Clinton E. Carey, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 440 days.

This patent is subject to a terminal disclaimer.

(21) Appl. No.: 12/327,844

(22) Filed: Dec. 4, 2008

(65) Prior Publication Data

US 2010/0144486 A1    Jun. 10, 2010

(51) Int. Cl.
*F16H 3/44* (2006.01)

(52) U.S. Cl. .................................................. 475/282

(58) Field of Classification Search .............. 475/282, 475/288, 296, 311, 317, 275
See application file for complete search history.

(56) References Cited

U.S. PATENT DOCUMENTS

| | | |
|---|---|---|
| 4,070,927 A | 1/1978 | Polak |
| 4,709,594 A | 12/1987 | Maeda |
| 5,106,352 A | 4/1992 | Lepelletier |
| 5,385,064 A | 1/1995 | Reece |
| 5,497,867 A | 3/1996 | Hirsch et al. |
| 5,560,461 A | 10/1996 | Loeffler |
| 5,599,251 A | 2/1997 | Beim et al. |
| 5,641,045 A | 6/1997 | Ogawa et al. |
| 5,651,435 A | 7/1997 | Perosky et al. |
| 5,975,263 A | 11/1999 | Forsyth |
| 6,053,839 A | 4/2000 | Baldwin et al. |
| 6,071,208 A | 6/2000 | Koivunen |
| 6,083,135 A | 7/2000 | Baldwin et al. |
| 6,217,474 B1 | 4/2001 | Ross et al. |
| 6,354,416 B1 | 3/2002 | Eo |
| 6,375,592 B1 | 4/2002 | Takahashi et al. |
| 6,422,969 B1 | 7/2002 | Raghavan et al. |
| 6,425,841 B1 | 7/2002 | Haka |
| 6,471,615 B1 | 10/2002 | Naraki et al. |
| 6,558,287 B2 | 5/2003 | Hayabuchi et al. |
| 6,623,397 B1 | 9/2003 | Raghavan et al. |
| 6,840,885 B2 | 1/2005 | Yi et al. |
| 7,651,431 B2 * | 1/2010 | Phillips et al. ............... 475/282 |
| 7,670,246 B2 * | 3/2010 | Kamm et al. ............... 475/275 |
| 7,695,398 B2 * | 4/2010 | Phillips et al. ............... 475/278 |
| 7,896,774 B2 * | 3/2011 | Phillips et al. ............... 475/275 |

FOREIGN PATENT DOCUMENTS

JP    09-126283    5/1997

* cited by examiner

*Primary Examiner* — Justin Holmes
(74) *Attorney, Agent, or Firm* — Quinn Law Group, PLLC

(57) ABSTRACT

The transmission has a plurality of members that can be utilized in powertrains to provide at least nine forward speed ratios and one reverse speed ratio. The transmission includes four planetary gear sets, six torque-transmitting devices, and four fixed interconnections. The powertrain includes an engine and torque converter that is continuously connected to one of the planetary gear members and an output member that is continuously connected with another one of the planetary gear members. The six torque-transmitting devices provide interconnections between various gear members, and the transmission housing, and are operated in combinations of three to establish at least nine forward speed ratios and one reverse speed ratio.

17 Claims, 6 Drawing Sheets

| GEAR STATE | GEAR RATIO | RATIO STEP | 180 | 182 | 184 | 185 | 186 | 187 |
|---|---|---|---|---|---|---|---|---|
| REV | -4.940 | | | X | | X | X | |
| N | 6.020 | -0.82 | | O | | | O | |
| 1st | 3.225 | 1.87 | X | X | X | | X | |
| 2nd | 2.178 | 1.48 | X | X | X | | | |
| 3rd | 1.698 | 1.28 | | | X | X | | |
| 4th | 1.400 | 1.21 | | | X | X | X | X |
| 5th | 1.225 | 1.14 | | | | X | | X |
| 6th | 1.000 | 1.23 | X | | | X | X | X |
| 7th | 0.928 | 1.08 | X | | | | X | X |
| 8th | 0.824 | 1.13 | X | | | | X | X |
| 9th | 0.750 | 1.10 | | | | | X | X |

| GEAR STATE | GEAR RATIO | RATIO STEP | 380 | 382 | 384 | 385 | 386 | 387 |
|---|---|---|---|---|---|---|---|---|
| REV | -6.764 | | | X | X | X | | |
| N | | -1.11 | | 0 | | | | |
| 1st | 6.101 | | x | x | | | x | |
| 2nd | 4.428 | 1.38 | | X | x | | X | |
| 3rd | 3.795 | 1.17 | X | X | X | | | |
| 4th | 2.753 | 1.38 | | X | X | | | X |
| 5th | 2.359 | 1.17 | X | X | | | | X |
| 6th | 1.735 | 1.36 | | X | | | X | X |
| 7th | 1.484 | 1.17 | | X | | X | | X |
| 8th | 1.191 | 1.25 | | X | | X | X | |
| 9th | 1.000 | 1.19 | | | | X | X | X |
| 10th | 0.824 | 1.21 | | | X | X | X | |
| 11th | 0.741 | 1.11 | X | | | X | X | |
| 12th | 0.662 | 1.12 | X | | | X | | X |
| 13th | 0.584 | 1.13 | | | X | X | | X |

FIG. 4c

| GEAR STATE | GEAR RATIO | RATIO STEP | 380 | 382 | 384 | 385 | 386 | 387 |
|---|---|---|---|---|---|---|---|---|
| REV | -6.044 | | | X | X | X | | |
| N | | -1.17 | | | | | | |
| 1st | 5.166 | | x | x | | | x | |
| 2nd | 3.496 | 1.48 | X | X | X | | | |
| 3rd | 2.419 | 1.45 | | X | X | | | X |
| 4th | 2.086 | 1.16 | X | X | | | | X |
| 5th | 1.594 | 1.31 | | X | | | X | X |
| 6th | 1.402 | 1.14 | | X | | X | | X |
| 7th | 1.137 | 1.23 | | X | | X | X | |
| 8th | 1.000 | 1.14 | | | | X | X | X |
| 9th | 0.847 | 1.18 | | | X | X | X | |
| 10th | 0.769 | 1.10 | X | | | X | X | |
| 11th | 0.670 | 1.15 | X | | | X | | X |
| 12th | 0.584 | 1.15 | | | X | X | | X |

FIG. 4d

| GEAR STATE | GEAR RATIO | RATIO STEP | 380 | 382 | 384 | 385 | 386 | 387 |
|---|---|---|---|---|---|---|---|---|
| REV | -5.185 | | | X | X | X | | |
| N | | -1.01 | | | | | | |
| 1st | 5.145 | | x | x | | | x | |
| 2nd | 3.467 | 1.48 | X | X | X | | | |
| 3rd | 2.353 | 1.47 | | X | X | | | x |
| 4th | 1.587 | 1.48 | | X | | | X | X |
| 5th | 1.406 | 1.13 | | X | | X | | X |
| 6th | 1.137 | 1.24 | | X | | X | X | |
| 7th | 1.000 | 1.14 | | | | X | X | X |
| 8th | 0.844 | 1.18 | | | X | X | X | |
| 9th | 0.766 | 1.10 | X | | | X | X | |
| 10th | 0.664 | 1.15 | X | | | X | | X |
| 11th | 0.578 | 1.15 | | | X | X | | X |

FIG. 4e

MULTI-SPEED TRANSMISSIONS

TECHNICAL FIELD

The present invention relates to a power transmission having four planetary gear sets that are controlled by six torque-transmitting devices to provide at least nine forward speed ratios and one reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five- or six-speed devices due to the size and complexity of these transmissions.

Seven-, eight-, nine- and ten-speed transmissions provide further improvements in acceleration and fuel economy over six-speed transmissions. However, like the six-speed transmissions discussed above, the development of seven-, eight-, nine- and ten-speed transmissions has been precluded because of complexity, size and cost.

SUMMARY OF THE INVENTION

It is an object of the present invention to provide an improved transmission having four planetary gear sets controlled to provide at least nine forward speed ratios and one reverse speed ratio.

The transmission family of the present invention has four planetary gear sets, each of which includes a first, second and third member, which members may comprise a sun gear, a ring gear, or a planet carrier assembly member, in any order.

In referring to the first, second, third and fourth gear sets in this description and in the claims, these sets may be counted "first" to "fourth" in any order in the drawing (i.e., left to right, right to left, etc.). Additionally, the first, second or third members of each gear set may be counted "first" to "third" in any order in the drawing (i.e., top to bottom, bottom to top, etc.) for each gear set.

Each carrier member can be either a single-pinion carrier member (simple) or a double-pinion carrier member (compound). Embodiments with long pinions are also possible.

A first interconnecting member continuously connects a member of the first planetary gear set with a member of the second planetary gear set.

A second interconnecting member continuously connects a member of the second planetary gear set with a member of the third planetary gear set.

A third interconnecting member continuously connects a member of the third planetary gear set with a member of the fourth planetary gear set.

A fourth interconnecting member continuously connects a member of the first planetary gear set with a member of the fourth planetary gear set.

The input member is continuously connected with a member of the first planetary gear set.

A first torque-transmitting device, such as a brake, selectively connects a member of the first or second planetary gear set with a stationary member (transmission housing/casing).

A second torque-transmitting device, such as a brake, selectively connects a member of the second planetary gear set with a stationary member (transmission housing/casing). Alternatively, a second torque-transmitting device, such as a clutch, selectively connects a member of the second planetary gear set with a member of the third planetary gear set.

A third torque-transmitting device, such as a clutch, selectively connects a member of the first planetary gear set with a member of the second or fourth planetary gear set. Alternatively, a third torque-transmitting device, such as a brake, selectively connects a member of the fourth planetary gear set with a stationary member (transmission housing/casing).

A fourth torque-transmitting device, such as a clutch, selectively connects a member of the first planetary gear set with a member of the second or third planetary gear set. Alternatively, a fourth torque-transmitting device, such as a brake, selectively connects a member of the first planetary gear set with a stationary member (transmission housing/casing).

A fifth torque-transmitting device, such as a clutch, selectively connects a member of the first planetary gear set with a member of the third planetary gear set. Alternatively, a fifth torque-transmitting device, such as a brake, selectively connects a member of the second planetary gear set with a stationary member (transmission housing/casing).

A sixth torque-transmitting device, such as a clutch, selectively connects a member of the first or third planetary gear set with a member of the second or fourth planetary gear set.

The six torque-transmitting devices are selectively engageable in combinations of three to yield at least nine forward speed ratios and one reverse speed ratio.

A variety of speed ratios and ratio spreads can be realized by suitably selecting the tooth ratios of the planetary gear sets.

The above features and other features and advantages of the present invention are readily apparent from the following detailed description of the best modes for carrying out the invention when taken in connection with the accompanying drawings.

BRIEF DESCRIPTION OF THE DRAWING

FIG. 1a is a schematic representation of a powertrain including a planetary transmission in accordance with the present invention;

FIG. 1b is a truth table and chart depicting some of the operating characteristics of the powertrain shown in FIG. 1a;

FIG. 2a is a schematic representation of a powertrain including a planetary transmission incorporating another family member of the present invention;

FIG. 2b is a truth table and chart depicting some of the operating characteristics of the powertrain shown in FIG. 2a;

FIG. 3a is a schematic representation of a powertrain including a planetary transmission incorporating another family member of the present invention;

FIG. 3b is a truth table and chart depicting some of the operating characteristics of the powertrain shown in FIG. 3a.

FIGS. 4c, 4d and 4e are truth tables and charts depicting some of the operating characteristics of the powertrain shown in FIG. 4a.

DESCRIPTION OF THE PREFERRED EMBODIMENT

Figures 1A, 1B:
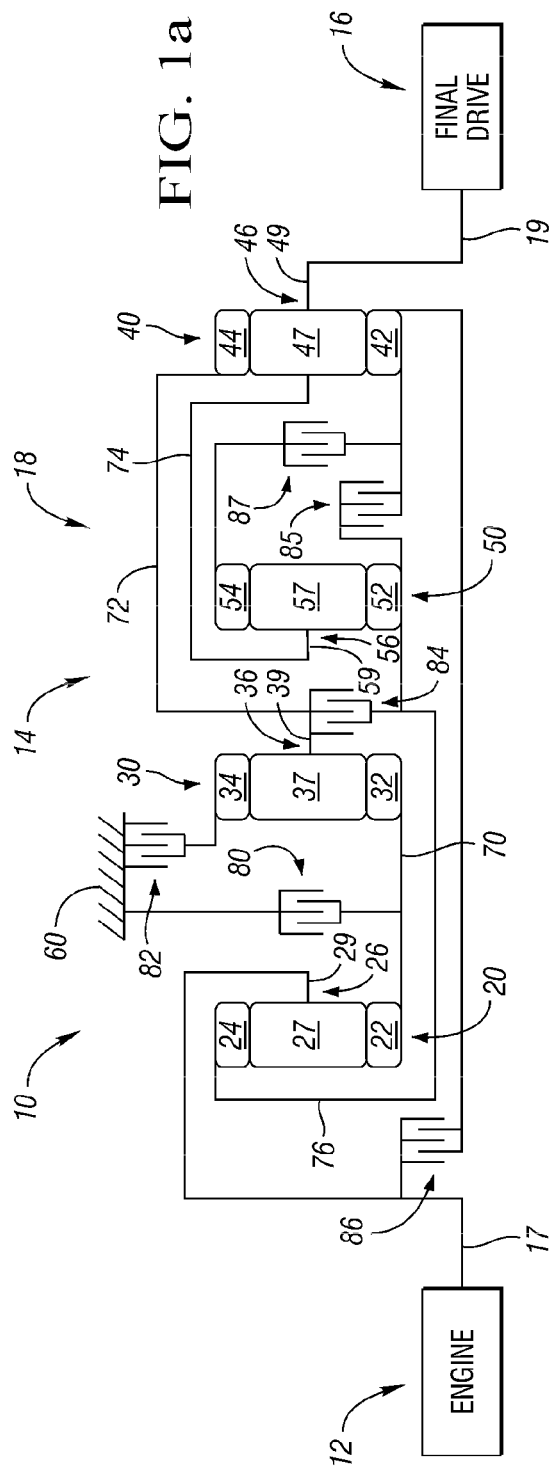

Referring to the drawings, there is shown in FIG. 1a a powertrain 10 having a conventional engine and torque converter 12, a planetary transmission 14, and a conventional final drive mechanism 16. The engine 12 may be powered using various types of fuel to improve the efficiency and fuel economy of a particular application. Such fuels may include, for example, gasoline; diesel; ethanol; dimethyl ether; etc.

The planetary transmission 14 includes an input member 17 continuously connected with the engine 12, a planetary gear arrangement 18, and an output member 19 continuously connected with the final drive mechanism 16. The planetary gear arrangement 18 includes four planetary gear sets 20, 30, 40 and 50.

The planetary gear set 20 includes a sun gear member 22, a ring gear member 24, and a planet carrier assembly member 26. The planet carrier assembly member 26 includes a plurality of pinion gears 27 rotatably mounted on a carrier member 29 and disposed in meshing relationship with both the sun gear member 22 and the ring gear member 24.

The planetary gear set 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the sun gear member 32 and the ring gear member 34.

The planetary gear set 40 includes a sun gear member 42, a ring gear member 44, and a planet carrier assembly member 46. The planet carrier assembly member 46 includes a plurality of pinion gears 47 mounted on a carrier member 49 and disposed in meshing relationship with both the ring gear member 44 and the sun gear member 42.

The planetary gear set 50 includes a sun gear member 52, a ring gear member 54, and a planet carrier assembly member 56. The planet carrier assembly member 56 includes a plurality of pinion gears 57 mounted on a carrier member 59 and disposed in meshing relationship with both the ring gear member 54 and the sun gear member 52.

The planetary gear arrangement also includes six torque-transmitting devices 80, 82, 84, 85, 86 and 87. The torque-transmitting devices 80 and 82 are stationary-type torque-transmitting devices, commonly termed brakes or reaction clutches. The torque-transmitting devices 84, 85, 86 and 87 are rotating-type torque-transmitting devices, commonly termed clutches.

The input member 17 is continuously connected with the planet carrier assembly member 26 of the planetary gear set 20. The output member 19 is continuously connected with the planet carrier assembly member 56 of the planetary gear set 50.

A first interconnecting member 70 continuously connects the sun gear member 22 of the planetary gear set 20 with the sun gear member 32 of the planetary gear set 30. A second interconnecting member 72 continuously connects the planet carrier assembly member 36 of the planetary gear set 30 with the ring gear member 44 of the planetary gear set 40. A third interconnecting member 74 continuously connects the planet carrier assembly member 46 of the planetary gear set 40 with the planet carrier assembly member 56 of the planetary gear set 50. A fourth interconnecting member 76 continuously connects the ring gear member 24 of the planetary gear set 20 with the sun gear member 52 of the planetary gear set 50.

A first torque-transmitting device, such as brake 80, selectively connects the sun gear member 22 of the planetary gear set 20 and the sun gear member 32 of the planetary gear set 30 via interconnecting member 70 with a stationary member 60. A second torque-transmitting device, such as a brake 82, selectively connects the ring gear member 34 of the planetary gear set 30 with a stationary member 60. A third torque-transmitting device, such as a clutch 84, selectively connects the ring gear member 24 of the planetary gear set 20 and sun gear member 52 of the planetary gear set 50 via interconnecting member 76 with the planet carrier assembly member 36 of the planetary gear set 30. A fourth torque-transmitting device, such as a clutch 85, selectively connects the ring gear member 24 of the planetary gear set 20 and the sun gear member 52 of the planetary gear set 50 via interconnecting member 76 with the sun gear member 42 of the planetary gear set 40. A fifth torque-transmitting device, such as clutch 86, selectively connects the planet carrier assembly member 26 of the planetary gear set 20 with the sun gear member 42 of the planetary gear set 40. A sixth torque-transmitting device, such as clutch 87, selectively connects the sun gear member 42 of the planetary gear set 40 with the ring gear member 54 of the planetary gear set 50.

As shown in FIG. 1b, and in particular the truth table disclosed therein, the torque-transmitting devices are selectively engaged in combinations of three to provide ten forward speed ratios and one reverse speed ratio, all with single transition sequential shifts with three overdrive ratios.

As set forth above, the engagement schedule for the torque-transmitting devices is shown in the truth table of FIG. 1b. The chart of FIG. 1b describes the ratio steps that are attained in the above described transmission. For example, the step ratio between the first and second forward speed ratios is 1.59, while the step ratio between the reverse speed ratio and first forward ratio is −1.03.

Figure 1C:
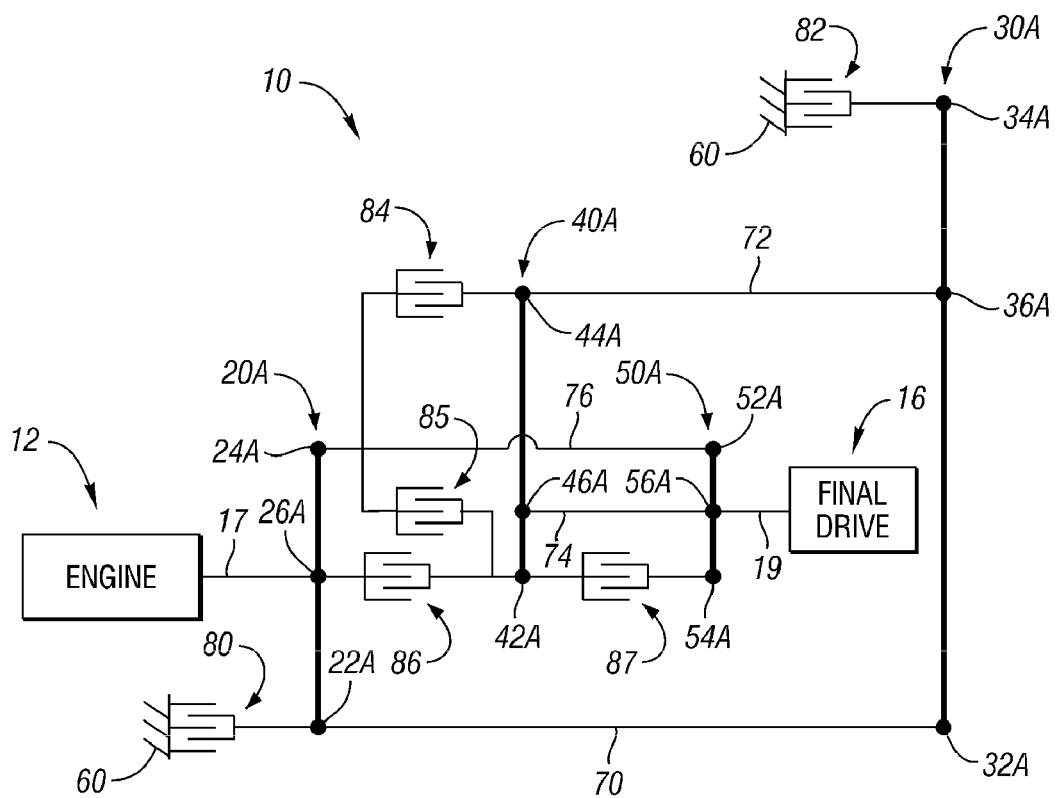
FIG. 1c is a schematic representation of the powertrain of FIG. 1a depicted in lever diagram form.

Referring to FIG. 1c, the embodiment of powertrain 10 depicted in FIG. 1a is illustrated in a lever diagram format. A lever diagram is a schematic representation of the components of a mechanical device such as an automatic transmission. Each individual lever represents a planetary gearset, wherein the three basic mechanical components of the planetary gear are each represented by a node. Therefore, a single lever contains three nodes: one for the sun gear member, one for the planet gear carrier member, and one for the ring gear member. The relative length between the nodes of each lever can be used to represent the ring-to-sun ratio of each respective gearset. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, authored by Benford, Howard and Leising, Maurice, "The Lever Analogy: A New Tool in Transmission Analysis", 1981, which is hereby fully incorporated by reference.

The powertrain 10 includes an input member 17 continuously connected with the engine 12, an output member 19 continuously connected with the final drive mechanism 16, a first planetary gear set 20A having three nodes: a first node 22A, a second node 26A and a third node 24A; a second planetary gear set 30A having three nodes: a first node 32A, a second node 36A and a third node 34A; a third planetary gear set 40A having three nodes: a first node 42A, a second node 46A and a third node 44A; and a fourth planetary gear set 50A having three nodes: a first node 52A, a second node 56A and a third node 54A.

The input member 17 is continuously connected with the node 26A. The output member 19 is continuously connected with the nodes 46A and 56A via interconnecting member 74.

The node 22A is continuously connected with node 32A via interconnecting member 70. The node 36A is continuously connected with node 44A via interconnecting member 72. The node 46A is continuously connected with node 56A via interconnecting member 74. The node 24A is continuously connected with node 52A via interconnecting member 76.

A first torque-transmitting device, such as brake 80, selectively connects the nodes 22A and 32A via interconnecting member 70 with the transmission housing 60. A second torque-transmitting device, such as brake 82, selectively connects the node 34A with the transmission housing 60. A third torque-transmitting device, such as clutch 84, selectively connects the nodes 24A and 52A via interconnecting member 76 with the nodes 36A and 44A via interconnecting member 72. A fourth torque-transmitting device, such as clutch 85, selectively connects the nodes 24A and 52A via interconnecting member 76 with the node 42A. A fifth torque-transmitting device, such as clutch 86, selectively connects the node 26A with the node 42A. A sixth torque-transmitting device, such as clutch 87, selectively connects the node 42A with the node 54A.

To establish ratios, three torque-transmitting devices are engaged for each gear state. The engaged torque-transmitting devices are represented by an "X" in each respective row of FIG. 1b. For example, to establish reverse gear, the brakes 80 and 82 and clutch 87 are engaged. The brake 80 engages the nodes 22A and 32A via interconnecting member 70 with the transmission housing 60. The brake 82 engages the node 34A with the transmission housing 60. The clutch 87 engages the node 42A with the node 54A. Likewise, the ten forward ratios are achieved through different combinations of clutch engagement as per FIG. 1b.

The powertrain 10 may share components with a hybrid vehicle, and such a combination may be operable in a "charge-depleting mode". For purposes of the present invention, a "charge-depleting mode" is a mode wherein the vehicle is powered primarily by an electric motor/generator such that a battery is depleted or nearly depleted when the vehicle reaches its destination. In other words, during the charge-depleting mode, the engine 12 is only operated to the extent necessary to ensure that the battery is not depleted before the destination is reached. A conventional hybrid vehicle operates in a "charge-sustaining mode", wherein if the battery charge level drops below a predetermined level (e.g., 25%) the engine is automatically run to recharge the battery. Therefore, by operating in a charge-depleting mode, the hybrid vehicle can conserve some or all of the fuel that would otherwise be expended to maintain the 25% battery charge level in a conventional hybrid vehicle. It should be appreciated that a hybrid vehicle powertrain is preferably only operated in the charge-depleting mode if the battery can be recharged after the destination is reached by plugging it into an energy source.

DESCRIPTION OF A SECOND EXEMPLARY EMBODIMENT

Figure 2C:
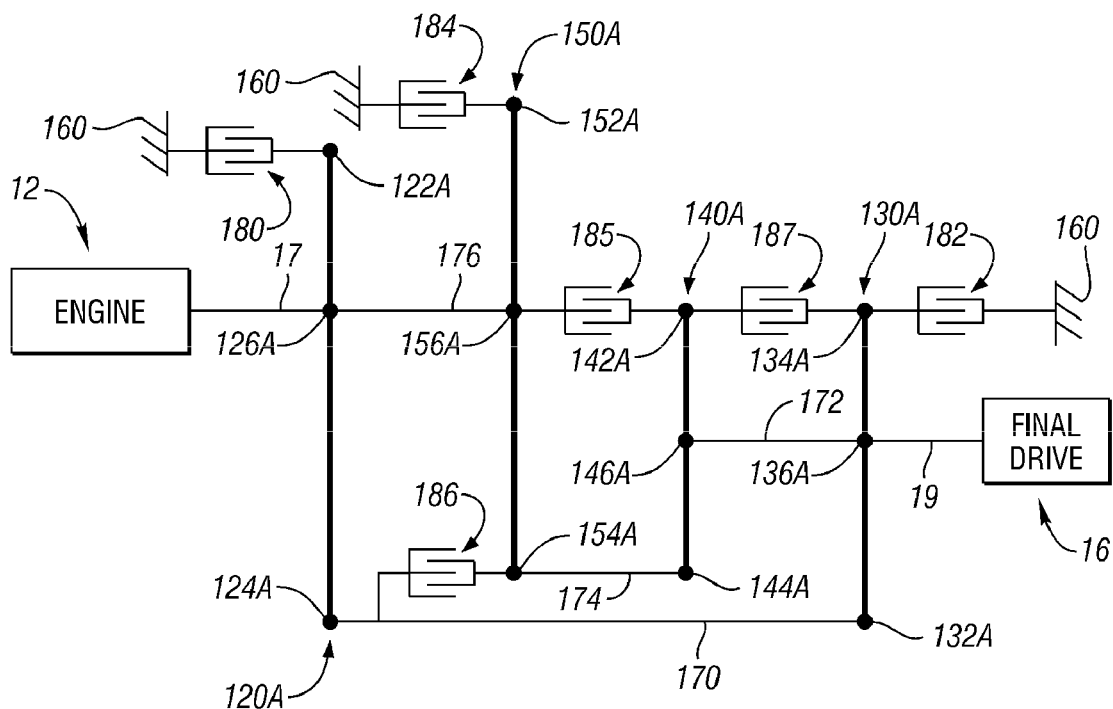
FIG. 2c is a schematic representation of the powertrain of FIG. 2a depicted in lever diagram form.
Figures 2A, 2B:
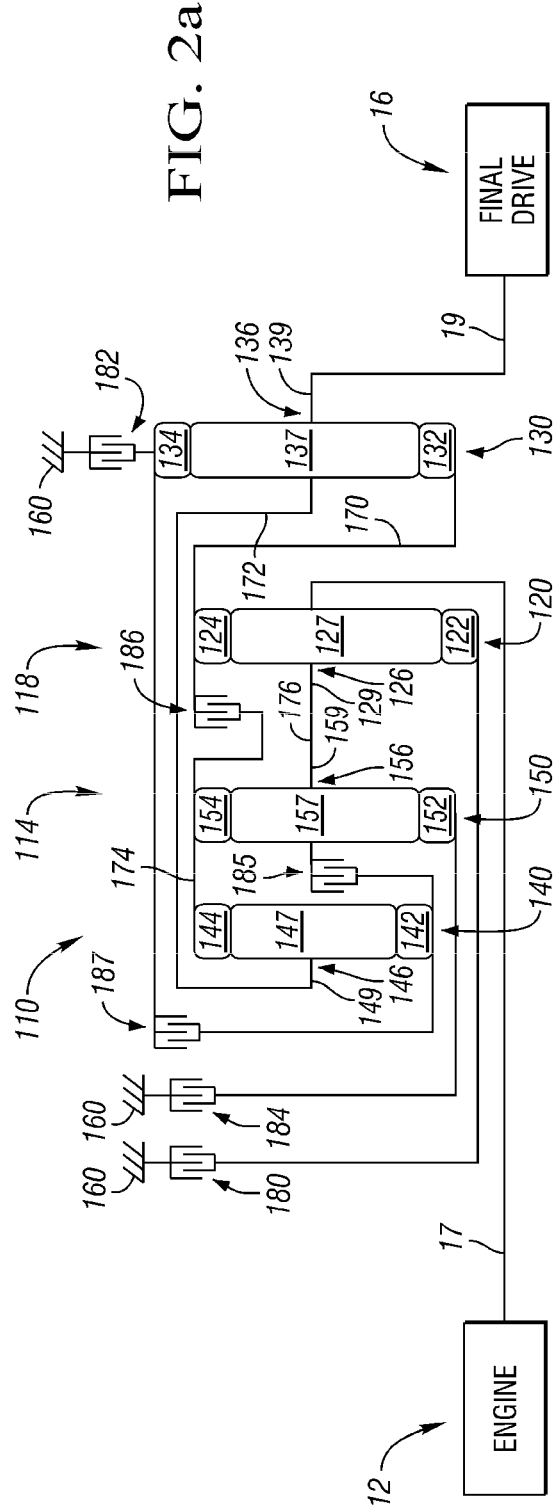

In FIG. 2a a powertrain 110 is shown having a conventional engine and torque converter 12, a planetary transmission 114, and a conventional final drive mechanism 16. The engine 12 may be powered using various types of fuel to improve the efficiency and fuel economy of a particular application. Such fuels may include, for example, gasoline; diesel; ethanol; dimethyl ether; etc.

The planetary transmission 114 includes an input member 17 continuously connected with the engine 12, a planetary gear arrangement 118, and an output member 19 continuously connected with the final drive mechanism 16. The planetary gear arrangement 118 includes four planetary gear sets 120, 130, 140 and 150.

The planetary gear set 120 includes a sun gear member 122, a ring gear member 124, and a planet carrier assembly member 126. The planet carrier assembly member 126 includes a plurality of pinion gears 127 rotatably mounted on a carrier member 129 and disposed in meshing relationship with both the sun gear member 122 and the ring gear member 124.

The planetary gear set 130 includes a sun gear member 132, a ring gear member 134, and a planet carrier assembly member 136. The planet carrier assembly member 136 includes a plurality of pinion gears 137 rotatably mounted on a carrier member 139 and disposed in meshing relationship with both the sun gear members 132 and the ring gear member 134.

The planetary gear set 140 includes a sun gear member 142, a ring gear member 144, and a planet carrier assembly member 146. The planet carrier assembly member 146 includes a plurality of pinion gears 147 mounted on a carrier member 149 and disposed in meshing relationship with both the ring gear member 144 and the sun gear member 142.

The planetary gear set 150 includes a sun gear member 152, a ring gear member 154, and a planet carrier assembly member 156. The planet carrier assembly member 156 includes a plurality of pinion gears 157 mounted on a carrier member 159 and disposed in meshing relationship with both the ring gear member 154 and the sun gear member 152.

The planetary gear arrangement also includes six torque-transmitting devices 180, 182, 184, 185, 186 and 187. The torque-transmitting devices 180, 182 and 184 are stationary-type torque-transmitting devices, commonly termed brakes or reaction clutches. The torque-transmitting devices 185, 186 and 187 are rotating-type torque-transmitting devices, commonly termed clutches.

The input member 17 is continuously connected with the planet carrier assembly member 126 of the planetary gear set 120. The output member 19 is continuously connected with the planet carrier assembly member 136 of the planetary gear set 130.

A first interconnecting member 170 continuously connects the ring gear member 124 of the planetary gear set 120 with the sun gear member 132 of the planetary gear set 130. A second interconnecting member 172 continuously connects the planet carrier assembly member 136 of the planetary gear set 130 with the planet carrier assembly member 146 of the planetary gear set 140. A third interconnecting member 174 continuously connects the ring gear member 144 of the planetary gear set 140 with the ring gear member 154 of the planetary gear set 150. A fourth interconnecting member 176 continuously connects the planet carrier assembly member 126 of the planetary gear set 120 with the planet carrier assembly member 156 of the planetary gear set 150.

A first torque-transmitting device, such as brake 180, selectively connects the sun gear member 122 of the planetary gear set 120 with the transmission housing 160. A second torque-transmitting device, such as a brake 182, selectively connects the ring gear member 134 of the planetary gear set 130 with the transmission housing 160. A third torque-transmitting device, such as brake 184, selectively connects the sun gear member 152 of the planetary gear set 150 with the transmission housing 160. A fourth torque-transmitting device, such as clutch 185, selectively connects the planet carrier assembly member 126 of the planetary gear set 120 and planet carrier assembly member 156 of the planetary gear set 150 via interconnecting member 176 with the sun gear member 142 of the planetary gear set 140. A fifth torque-transmitting device, such as clutch 186, selectively connects the ring gear member 124 of the planetary gear set 120 with the ring gear member 144 of the planetary gear set 140 and ring gear member 154 of the planetary gear set 150 via interconnecting member 174. A sixth torque-transmitting device, such as clutch 187, selectively connects the ring gear member 134 of the planetary gear set 130 with the sun gear member 142 of the planetary gear set 140.

As shown in FIG. 2b, and in particular the truth table disclosed therein, the torque-transmitting devices are selectively engaged in combinations of three to provide ten forward speed ratios and one reverse speed ratio, all with single transition sequential shifts with three overdrive ratios.

As set forth above, the engagement schedule for the torque-transmitting devices is shown in the truth table of FIG. 2b. The chart of FIG. 2b describes the ratio steps that are attained in the above described transmission. For example, the step ratio between the first and second forward speed ratios is 1.87, while the step ratio between the reverse speed ratio and first forward ratio is –0.82.

Referring to FIG. 2c, the embodiment of powertrain 110 depicted in FIG. 2a is illustrated in a lever diagram format. The powertrain 110 includes an input member 17 continuously connected with the engine 12, an output member 19 continuously connected with the final drive mechanism 16, a first planetary gear set 120A having three nodes: a first node 122A, a second node 126A and a third node 124A; a second planetary gear set 130A having three nodes: a first node 132A, a second node 136A and a third node 134A; a third planetary gear set 140A having three nodes: a first node 142A, a second node 146A and a third node 144A; and a fourth planetary gear set 150A having three nodes: a first node 152A, a second node 156A and a third node 154A.

The input member 17 is continuously connected with the nodes 126A and 156A via interconnecting member 176. The output member 19 is continuously connected with the nodes 136A and 146A via interconnecting member 172.

The node 124A is continuously connected with node 132A via interconnecting member 170. The node 136A is continuously connected with the node 146A via interconnecting member 172. The node 144A is continuously connected with the node 154A via interconnecting member 174. The node 126A is continuously connected with the node 156A via interconnecting member 176.

A first torque-transmitting device, such as brake 180, selectively connects the node 122A with the transmission housing 160. A second torque-transmitting device, such as brake 182, selectively connects the node 134A with the transmission housing 160. A third torque-transmitting device, such as brake 184, selectively connects the node 152A with the transmission housing 160. A fourth torque-transmitting device, such as clutch 185, selectively connects the nodes 126A and 156A via interconnecting member 176 with the node 142A. A fifth torque-transmitting device, such as clutch 186, selectively connects the nodes 124A and 132A via interconnecting member 170 with the nodes 144A and 154A via interconnecting member 174. A sixth torque-transmitting device, such as clutch 187, selectively connects the node 134A with the node 142A.

To establish ratios, three torque-transmitting devices are engaged for each gear state. The engaged torque-transmitting devices are represented by an "X" in each respective row of FIG. 2b. For example, to establish reverse gear, the brake 182 and clutches 185 and 186 are engaged. The brake 182 engages the node 134A with the transmission housing 160. The clutch 185 engages the nodes 126A and 156A via interconnecting member 176 with the node 142A. The clutch 186 engages the node 124A with the nodes 144A and 154A via interconnecting member 174. Likewise, the ten forward ratios are achieved through different combinations of clutch engagement as per FIG. 2b.

DESCRIPTION OF A THIRD EXEMPLARY EMBODIMENT

Figures 3A, 3B:
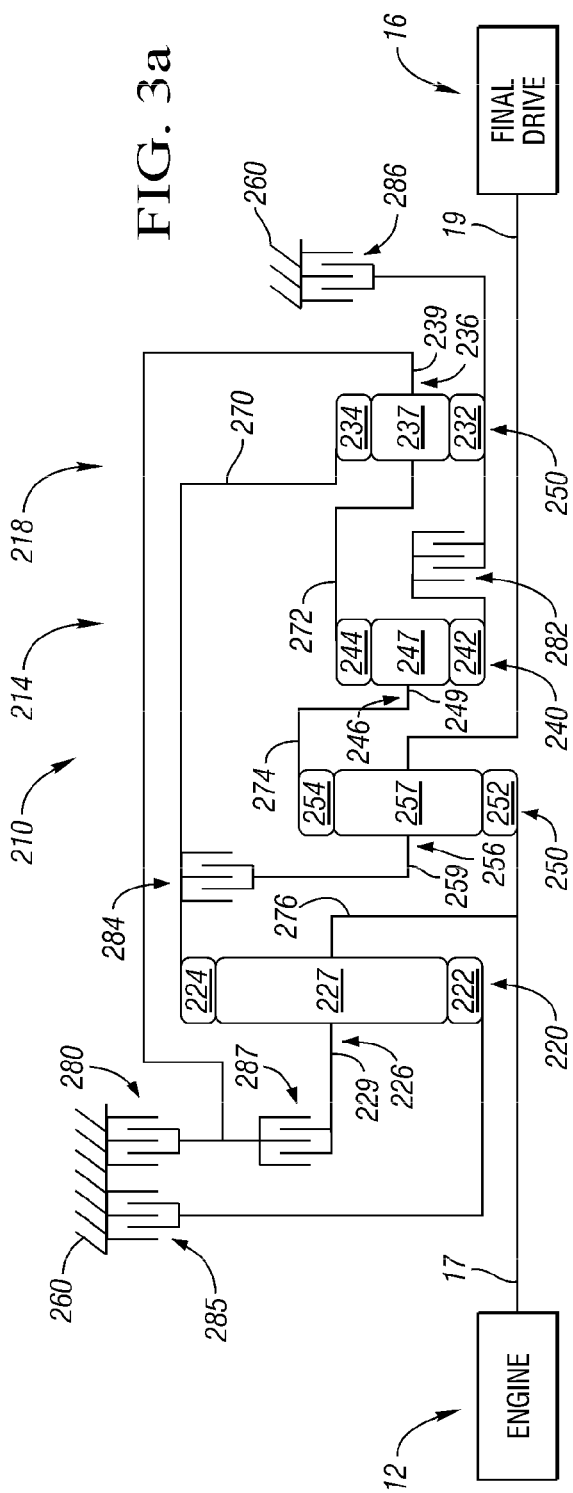

In FIG. 3a a powertrain 210 is shown having a conventional engine and torque converter 12, a planetary transmission 214, and a conventional final drive mechanism 16. The engine 12 may be powered using various types of fuel to improve the efficiency and fuel economy of a particular application. Such fuels may include, for example, gasoline; diesel; ethanol; dimethyl ether; etc.

The planetary transmission 214 includes an input member 17 continuously connected with the engine 12, a planetary gear arrangement 218, and an output member 19 continuously connected with the final drive mechanism 16. The planetary gear arrangement 218 includes four planetary gear sets 220, 230, 240 and 250.

The planetary gear set 220 includes a sun gear member 222, a ring gear member 224, and a planet carrier assembly member 226. The planet carrier assembly member 226 includes a plurality of pinion gears 227 rotatably mounted on a carrier member 229 and disposed in meshing relationship with both the sun gear member 222 and the ring gear member 224.

The planetary gear set 230 includes a sun gear member 232, a ring gear member 234, and a planet carrier assembly member 236. The planet carrier assembly member 236 includes a plurality of pinion gears 237 rotatably mounted on a carrier member 239 and disposed in meshing relationship with both the sun gear members 232 and the ring gear member 234.

The planetary gear set 240 includes a sun gear member 242, a ring gear member 244, and a planet carrier assembly member 246. The planet carrier assembly member 246 includes a plurality of pinion gears 247 mounted on a carrier member 249 and disposed in meshing relationship with both the ring gear member 244 and the sun gear member 242.

The planetary gear set 250 includes a sun gear member 252, a ring gear member 254, and a planet carrier assembly member 256. The planet carrier assembly member 256 includes a plurality of pinion gears 257 mounted on a carrier member 259 and disposed in meshing relationship with both the ring gear member 254 and the sun gear member 252.

The planetary gear arrangement also includes six torque-transmitting devices 280, 282, 284, 285, 286 and 287. The torque-transmitting devices 280, 285 and 286 are stationary-type torque-transmitting devices, commonly termed brakes or reaction clutches. The torque-transmitting devices 282, 284 and 287 are rotating-type torque-transmitting devices, commonly termed clutches.

The input member 17 is continuously connected with the planet carrier assembly member 226 of the planetary gear set 220. The output member 19 is continuously connected with the planet carrier assembly member 256 of the planetary gear set 250.

A first interconnecting member 270 continuously connects the ring gear member 224 of the planetary gear set 220 with the ring gear member 234 of the planetary gear set 230. A second interconnecting member 272 continuously connects the planet carrier assembly member 236 of the planetary gear set 230 with the ring gear member 244 of the planetary gear set 240. A third interconnecting member 274 continuously connects the planet carrier assembly member 246 of the planetary gear set 240 with the ring gear member 254 of the planetary gear set 250. A fourth interconnecting member 276 continuously connects the planet carrier assembly member 226 of the planetary gear set 220 with the sun gear member 252 of the planetary gear set 250.

A first torque-transmitting device, such as brake 280, selectively connects the planet carrier assembly member 236 of the planetary gear set 230 with the transmission housing 260. A second torque-transmitting device, such as clutch 282, selectively connects the sun gear member 232 of the planetary gear set 230 with the sun gear member 242 of the planetary gear set 240. A third torque-transmitting device, such as clutch 284, selectively connects the ring gear member 224 of the planetary gear set 220 and ring gear member 234 of the planetary gear set 230 via interconnecting member 270 with the planet carrier assembly member 256 of the planetary gear set 250. A fourth torque-transmitting device, such as brake 285, selectively connects the sun gear member 222 of the planetary gear set 220 with the transmission housing 260. A fifth torque-transmitting device, such as brake 286, selectively connects the sun gear member 232 of the planetary gear set 230 with the transmission housing 260. A sixth torque-transmitting device, such as clutch 287, selectively connects the planet carrier assembly member 226 of the planetary gear set 220 and sun gear member 252 of the planetary gear set 250 via interconnecting member 276 with the planet carrier assembly member 236 of the planetary gear set 230.

As shown in FIG. 3b, and in particular the truth table disclosed therein, the torque-transmitting devices are selectively engaged in combinations of three to provide nine forward speed ratios and one reverse speed ratio, all with single transition sequential shifts and having two overdrive ratios.

As set forth above, the engagement schedule for the torque-transmitting devices is shown in the truth table of FIG. 3b. The chart of FIG. 3b describes the ratio steps that are attained in the above described transmission. For example, the step ratio between the first and second forward speed ratios is 1.45, while the step ratio between the reverse speed ratio and first forward ratio is −0.80.

DESCRIPTION OF A FOURTH EXEMPLARY EMBODIMENT

Figure 4A:
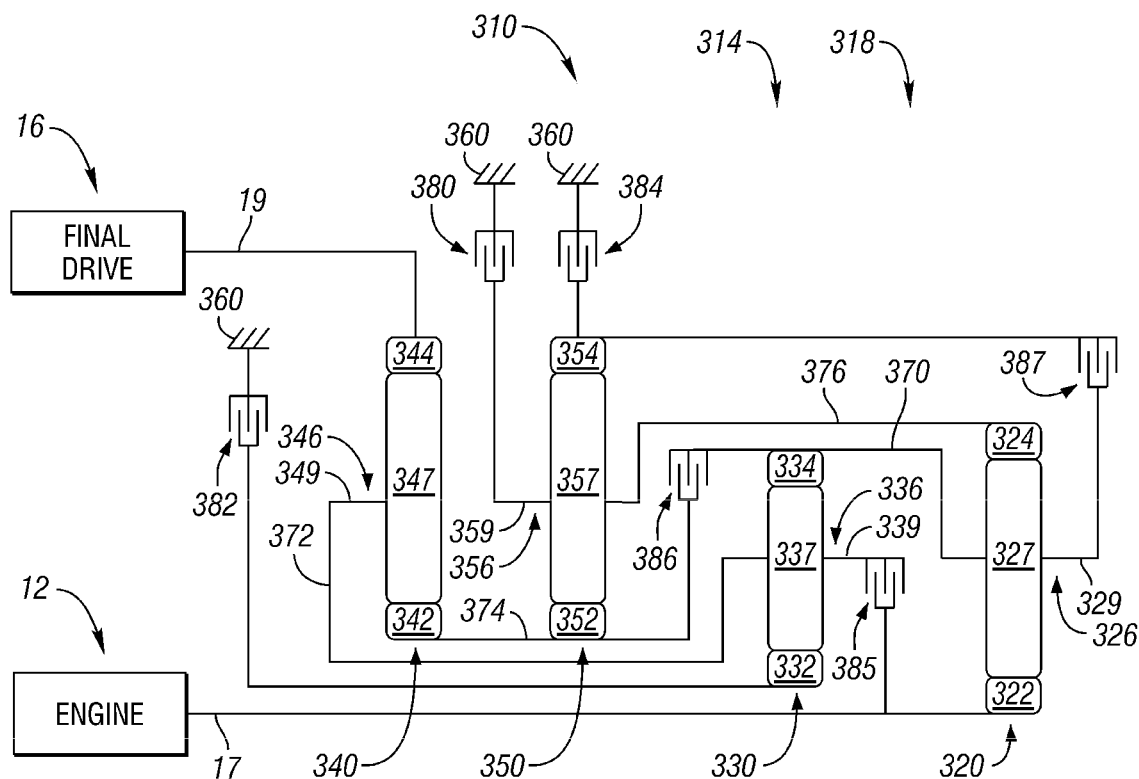
FIG. 4a is a schematic representation of a powertrain including a planetary transmission incorporating another family member of the present invention.

In FIG. 4a a powertrain 310 is shown having a conventional engine and torque converter 12, a planetary transmission 314, and a conventional final drive mechanism 16. The engine 12 may be powered using various types of fuel to improve the efficiency and fuel economy of a particular application. Such fuels may include, for example, gasoline; diesel; ethanol; dimethyl ether; etc.

The planetary transmission 314 includes an input member 17 continuously connected with the engine 12, a planetary gear arrangement 318, and an output member 19 continuously connected with the final drive mechanism 16. The planetary gear arrangement 318 includes four planetary gear sets 320, 330, 340 and 350.

The planetary gear set 320 includes a sun gear member 322, a ring gear member 324, and a planet carrier assembly member 326. The planet carrier assembly member 326 includes a plurality of pinion gears 327 rotatably mounted on a carrier member 329 and disposed in meshing relationship with both the sun gear member 322 and the ring gear member 324.

The planetary gear set 330 includes a sun gear member 332, a ring gear member 334, and a planet carrier assembly member 336. The planet carrier assembly member 336 includes a plurality of pinion gears 337 rotatably mounted on a carrier member 339 and disposed in meshing relationship with both the sun gear members 332 and the ring gear member 334.

The planetary gear set 340 includes a sun gear member 342, a ring gear member 344, and a planet carrier assembly member 346. The planet carrier assembly member 346 includes a plurality of pinion gears 347 mounted on a carrier member 349 and disposed in meshing relationship with both the ring gear member 344 and the sun gear member 342.

The planetary gear set 350 includes a sun gear member 352, a ring gear member 354, and a planet carrier assembly member 356. The planet carrier assembly member 356 includes a plurality of pinion gears 357 mounted on a carrier member 359 and disposed in meshing relationship with both the ring gear member 354 and the sun gear member 352.

The planetary gear arrangement also includes six torque-transmitting devices 380, 382, 384, 385, 386 and 387. The torque-transmitting devices 380, 382 and 384 are stationary-type torque-transmitting devices, commonly termed brakes or reaction clutches. The torque-transmitting devices 385, 386 and 387 are rotating-type torque-transmitting devices, commonly termed clutches.

The input member 17 is continuously connected with the sun gear member 322 of the planetary gear set 320. The output member 19 is continuously connected with the ring gear member 344 of the planetary gear set 340.

A first interconnecting member 370 continuously connects the planet carrier assembly member 326 of the planetary gear set 320 with the ring gear member 344 of the planetary gear set 340. A second interconnecting member 372 continuously connects the planet carrier assembly member 336 of the planetary gear set 330 with the planet carrier assembly member 346 of the planetary gear set 340. A third interconnecting member 374 continuously connects the sun gear member 342 of the planetary gear set 340 with the sun gear member 352 of the planetary gear set 350. A fourth interconnecting member 376 continuously connects the ring gear member 324 of the planetary gear set 320 with the planet carrier assembly member 356 of the planetary gear set 350.

A first torque-transmitting device, such as brake 380, selectively connects the ring gear member 324 of the planetary gear set 320 and planet carrier assembly member 356 of the planetary gear set 350 via interconnecting member 376 with the transmission housing 360. A second torque-transmitting device, such as brake 382, selectively connects the sun gear member 332 of the planetary gear set 330 with the transmission housing 360. A third torque-transmitting device, such as brake 384, selectively connects the ring gear member 354 of the planetary gear set 350 with the transmission housing 360. A fourth torque-transmitting device, such as clutch 385, selectively connects the sun gear member 322 of the planetary gear set 320 with the planet carrier assembly member 336 of the planetary gear set 330 and planet carrier assembly member 346 of the planetary gear set 340 via interconnecting member 372. A fifth torque-transmitting device, such as clutch 386, selectively connects the planet carrier assembly member 326 of the planetary gear set 320 and ring gear member 334 of the planetary gear set 330 via interconnecting member 370 with the sun gear member 342 of the planetary gear set 340 and sun gear member 352 of the planetary gear set 350 via interconnecting member 374. A sixth torque-transmitting device, such as clutch 387, selectively connects the planet carrier assembly member 326 of the planetary gear set 320 and ring gear member 334 of the planetary gear set 340 via interconnecting member 370 with the ring gear member 354 of the planetary gear set 350.

FIGS. 4c, 4d and 4e show three different operational charts for use with the transmission of FIG. 4a. As shown in FIGS. 4c, 4d and 4e, and in particular the truth table disclosed therein, the torque-transmitting devices are selectively engaged in combinations of three to provide eleven, twelve or thirteen forward speed ratios and one reverse speed ratio, all with single transition sequential shifts with four overdrive ratios.

As set forth above, the engagement schedule for the torque-transmitting devices is shown in the truth tables of FIGS. 4c, 4d and 4e. The chart of FIG. 4c describes the ratio steps that are attained in the above described transmission. For example, the step ratio between the first and second forward speed ratios is 1.38, while the step ratio between the reverse speed ratio and first forward ratio is −1.11.

Figure 4B:
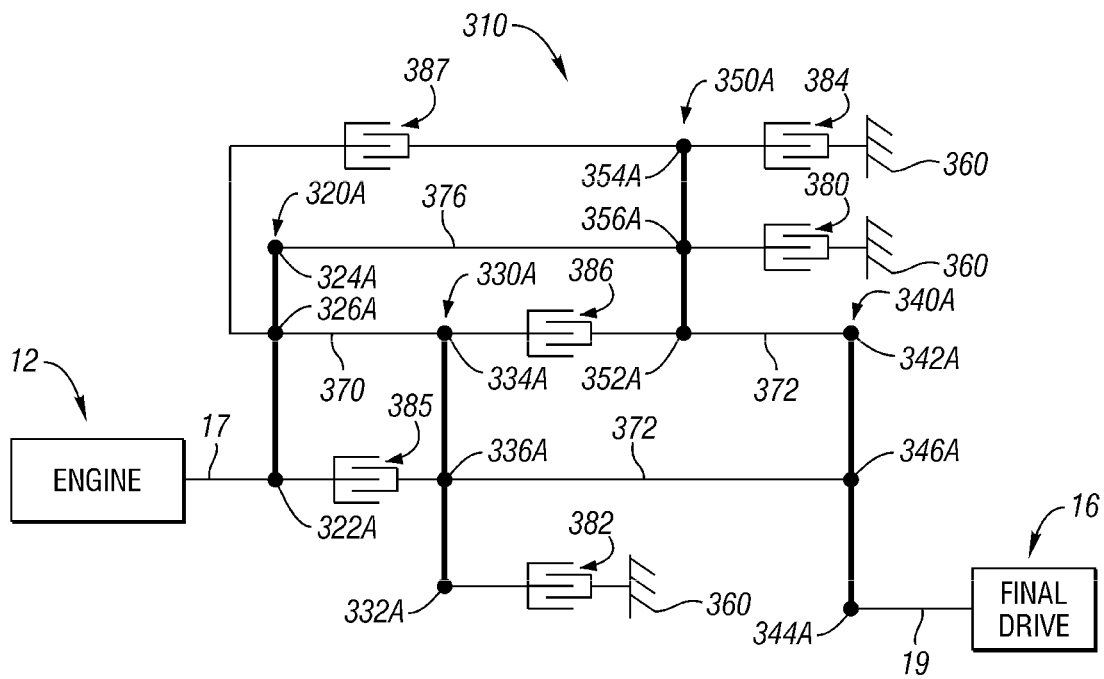
FIG. 4b is a schematic representation of the powertrain of FIG. 4a depicted in lever diagram form.

Referring to FIG. 4b, the embodiment of powertrain 310 depicted in FIG. 4a is illustrated in a lever diagram format. The powertrain 310 includes an input member 17 continuously connected with the engine 12, an output member 19 continuously connected with the final drive mechanism 16, a first planetary gear set 320A having three nodes: a first node 322A, a second node 326A and a third node 324A; a second planetary gear set 330A having three nodes: a first node 332A, a second node 336A and a third node 334A; a third planetary gear set 340A having three nodes: a first node 342A, a second node 346A and a third node 344A; and a fourth planetary gear set 350A having three nodes: a first node 352A, a second node 356A and a third node 354A.

The input member 17 is continuously connected with the node 322A. The output member 19 is continuously connected with the node 344A.

The node 326A is continuously connected with node 334A via interconnecting member 370. The node 336A is continuously connected with the node 346A via interconnecting member 372. The node 342A is continuously connected with the node 352A via interconnecting member 374. The node 324A is continuously connected with the node 356A via interconnecting member 376.

A first torque-transmitting device, such as brake 380, selectively connects the nodes 324A and 356A via interconnecting member 376 with the transmission housing 360. A second torque-transmitting device, such as brake 382, selectively connects the node 332A with the transmission housing 360. A third torque-transmitting device, such as brake 384, selectively connects the node 354A with the transmission housing 360. A fourth torque-transmitting device, such as clutch 385, selectively connects the node 322A with the nodes 336A and 346A via interconnecting member 372. A fifth torque-transmitting device, such as clutch 386, selectively connects the nodes 326A and 334A via interconnecting member 370 with the nodes 342A and 352A via interconnecting member 372. A sixth torque-transmitting device, such as clutch 387, selectively connects the nodes 326A and 334A via interconnecting member 370 with the node 354A.

To establish ratios, three torque-transmitting devices are engaged for each gear state. The engaged torque-transmitting devices are represented by an "X" in each respective row of FIG. 4c, 4d or 4e. For example, using the operating scheme of FIG. 4c, to establish reverse gear, the brakes 382 and 384 and clutch 385 are engaged. The brake 382 engages the node 332A with the transmission housing 360. The brake 384 engages the node 354A with the transmission housing 360. The clutch 385 engages the node 322A with the nodes 336A and 346A via interconnecting member 372. Likewise, the thirteen forward ratios are achieved through different combinations of clutch engagement as per FIG. 4c.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
    an input member;
    an output member;
    first, second, third and fourth planetary gear sets each having first, second and third members;
    said input member being continuously connected to a member of said first planetary gear set;
    said output member is continuously connected to a member of said second planetary gear set, said third planetary gear set or said fourth planetary gear set;
    a first interconnecting member continuously connecting a member of said first planetary gear set with a member of said second planetary gear set;
    a second interconnecting member continuously connecting a member of said second planetary gear set with a member of said third planetary gear set;
    a third interconnecting member continuously connecting a member of said third planetary gear set with a member of said fourth planetary gear set;
    a fourth interconnecting member continuously connecting a member of said first planetary gear set with a member of said fourth planetary gear set; and
    six torque-transmitting devices being engaged in combinations of three to establish at least nine forward speed ratios and at least one reverse speed ratio between said input member and said output member.

2. The transmission of claim 1, wherein a first of said six torque-transmitting devices selectively connects a member of said first planetary gear set or said second planetary gear set with a stationary member.

3. The transmission of claim 2, wherein a second of said six torque-transmitting devices selectively connects a member of said second planetary gear set with said stationary member, or with a member of said third planetary gear set.

4. The transmission of claim 3, wherein a third of said six torque-transmitting devices selectively connects a member of said first planetary gear set with a member of said second planetary gear set or said fourth planetary gear set; alternatively a third torque-transmitting device selectively connects a member of said fourth planetary gear set with said stationary member.

5. The transmission of claim 4, wherein a fourth of said six torque-transmitting devices selectively connects a member of said first planetary gear set with a member of said second planetary gear set, a member of said third planetary gear set or with said stationary member.

6. The transmission of claim 5, wherein a fifth of said six torque-transmitting devices selectively connects a member of the first planetary gear set with a member of the third planetary gear set; alternatively, a third torque-transmitting device selectively connects a member of the second planetary gear set with said stationary member.

7. The transmission of claim 6, wherein a sixth of said six torque-transmitting devices selectively connects a member of said first, second or third planetary gear set with another member of said second, third or fourth planetary gear set.

8. The transmission of claim 7, wherein said first, second and third members of said first, second, third and fourth planetary gear sets comprise a sun gear member, a planet carrier assembly member and a ring gear member, respectively.

9. The transmission of claim 1, wherein
said input member is continuously connected with said second member of said first planetary gear set;
said output member is continuously connected with said second member of said third planetary gear set;
said first interconnecting member continuously connects said first member of said first planetary gear set with said first member of said second planetary gear set;
said second interconnecting member continuously connects said second member of said second planetary gear set with said third member of said third planetary gear set;
said third interconnecting member continuously connects said second member of said third planetary gear set with said second member of said fourth planetary gear set;
said fourth interconnecting member continuously connects said third member of said first planetary gear set with said first member of said fourth planetary gear set;
said first torque-transmitting device selectively connects said first member of said first planetary gear set with said stationary member;
said second torque-transmitting device selectively connects said third member of said second planetary gear set with said stationary member;
said third torque-transmitting device selectively connects said third member of said first planetary gear set with said second member of said second planetary gear set;
said fourth torque-transmitting device selectively connects said third member of said first planetary gear set with said first member of said third planetary gear set;
said fifth torque-transmitting device selectively connects said second member of said first planetary gear set with said third member of said third planetary gear set; and
said sixth torque-transmitting device selectively connects said first member of said third planetary gear set with said third member of said fourth planetary gear set.

10. The transmission of claim 9, wherein said first, second and third members of said first, second, third and fourth planetary gear sets comprise a sun gear member, a planet carrier assembly member and a ring gear member, respectively.

11. The transmission of claim 1, wherein
said input member is continuously connected with said second member of said first planetary gear set;
said output member is continuously connected with said second member of said second planetary gear set;
said first interconnecting member continuously connects said third member of said first planetary gear set with said first member of said second planetary gear set;
said second interconnecting member continuously connects said second member of said second planetary gear set with said second member of said third planetary gear set;
said third interconnecting member continuously connects said third member of said third planetary gear set with said third member of said fourth planetary gear set;
said fourth interconnecting member continuously connects said second member of said first planetary gear set with said second member of said fourth planetary gear set;
said first torque-transmitting device selectively connects said first member of said first planetary gear set with said stationary member;
said second torque-transmitting device selectively connects said third member of said second planetary gear set with said stationary member;
said third torque-transmitting device selectively connects said first member of said fourth planetary gear set with said stationary member;
said fourth torque-transmitting device selectively connects said second member of said first planetary gear set with said first member of said third planetary gear set;
said fifth torque-transmitting device selectively connects said third member of said first planetary gear set with said third member of said third planetary gear set; and
said sixth torque-transmitting device selectively connects said third member of said second planetary gear set with said first member of said third planetary gear set.

12. The transmission of claim 11, wherein said first, second and third members of said first, second, third and fourth planetary gear sets comprise a sun gear member, a planet carrier assembly member and a ring gear member, respectively.

13. The transmission of claim 1, wherein
said input member is continuously connected with said second member of said first planetary gear set;
said output member is continuously with said second member of said fourth planetary gear set;
said first interconnecting member continuously connects said third member of said first planetary gear set with said third member of said second planetary gear set;
said second interconnecting member continuously connects said second member of said second planetary gear set with said third member of said third planetary gear set;
said third interconnecting member continuously connects said second member of said third planetary gear set with said third member of said fourth planetary gear set;
said fourth interconnecting member continuously connects said second member of said first planetary gear set with said first member of said fourth planetary gear set;
said first torque-transmitting device selectively connects said second member of said second planetary gear set with said stationary member;

said second torque-transmitting device selectively connects said first member of said second planetary gear set with said first member of said third planetary gear set;

said third torque-transmitting device selectively connects said third member of said first planetary gear set with said second member of said fourth planetary gear set;

said fourth torque-transmitting device selectively connects said first member of said first planetary gear set with said stationary member;

said fifth torque-transmitting device selectively connects said first member of said second planetary gear set with said stationary member; and said sixth torque-transmitting device selectively connects said second member of said first planetary gear set with said second member of said second planetary gear set.

14. The transmission of claim 13, wherein said first, second and third members of said first, second, third and fourth planetary gear sets comprise a sun gear member, a planet carrier assembly member and a ring gear member, respectively.

15. The transmission of claim 1, wherein
said input member is continuously connected with said first member of said first planetary gear set;
said output member is continuously connected with said third member of said third planetary gear set;
said first interconnecting member continuously connects said second member of said first planetary gear set with said third member of said second planetary gear set;
said second interconnecting member continuously connects said second member of said second planetary gear set with said second member of said third planetary gear set;
said third interconnecting member continuously connects said first member of said third planetary gear set with said first member of said fourth planetary gear set;
said fourth interconnecting member continuously connects third member of said first planetary gear set with said second member of said fourth planetary gear set;
said first torque-transmitting device selectively connects said third member of said first planetary gear set with said stationary member;
said second torque-transmitting device selectively connects said first member of said second planetary gear set with said stationary member;
said third torque-transmitting device selectively connects said third member of said fourth planetary gear set with said stationary member;
said fourth torque-transmitting device selectively connects said first member of said first planetary gear set with said second member of said second planetary gear set;
said fifth torque-transmitting device selectively connects said second member of said first planetary gear set with said first member of said third planetary gear set; and
said sixth torque-transmitting device selectively connects said second member of said first planetary gear set with said third member of said fourth planetary gear set.

16. The transmission of claim 15, wherein said first, second and third members of said first, second, third and fourth planetary gear sets comprise a sun gear member, a planet carrier assembly member and a ring gear member, respectively.

17. A multi-speed transmission comprising:
an input member;
an output member;
first, second, third and fourth planetary gear sets each having a sun gear member, planet carrier assembly member and ring gear member;
said input member being continuously connected to said planet carrier assembly member of said first planetary gear set;
said output member is continuously connected to said planet carrier assembly member of said third planetary gear set;
a first interconnecting member continuously connecting said sun gear member of said first planetary gear set with said sun gear member of said second planetary gear set;
a second interconnecting member continuously connecting said planet carrier assembly member of said second planetary gear set with said ring gear member of said third planetary gear set;
a third interconnecting member continuously connecting planet carrier assembly member of said third planetary gear set with said planet carrier assembly member of said fourth planetary gear set;
a fourth interconnecting member continuously connecting said ring gear member of said first planetary gear set with said sun gear member of said fourth planetary gear set;
a first torque-transmitting device selectively connecting said sun gear member of said first planetary gear set with a stationary member;
a second torque-transmitting device selectively connecting said ring gear member of said second planetary gear set with said stationary member;
a third torque-transmitting device selectively connecting said ring gear member of said first planetary gear set with said planet carrier assembly member of said second planetary gear set;
a fourth torque-transmitting device selectively connecting said ring gear member of said first planetary gear set with said sun gear member of said third planetary gear set;
a fifth torque-transmitting device selectively connecting said planet carrier assembly member of said first planetary gear set with said sun gear member of said third planetary gear set;
a sixth torque-transmitting device selectively connecting said sun gear member of said third planetary gear set with said ring gear member of said fourth planetary gear set; and
said six torque-transmitting devices being engaged in combinations of three to establish at least nine forward speed ratios and at least one reverse speed ratio between said input member and said output member.

* * * * *